United States Patent
Riefe

(10) Patent No.: US 7,048,306 B2
(45) Date of Patent: May 23, 2006

(54) STEERING COLUMN WITH TUBULAR STRUCTURE

(75) Inventor: Richard K. Riefe, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 71 days.

(21) Appl. No.: 10/235,409

(22) Filed: Sep. 5, 2002

(65) Prior Publication Data

US 2004/0046379 A1 Mar. 11, 2004

(51) Int. Cl.
B62D 1/19 (2006.01)
(52) U.S. Cl. ..................................... 280/777
(58) Field of Classification Search ............... 280/777, 280/775, 779; 74/493, 495
See application file for complete search history.

(56) References Cited

U.S. PATENT DOCUMENTS

| | | | |
|---|---|---|---|
| 2,779,208 A | | 1/1957 | Pittman et al. |
| 3,245,282 A | | 4/1966 | Kimberlin |
| 3,396,600 A | | 8/1968 | Zeigler et al. |
| 3,980,314 A | * | 9/1976 | Kopf ......................... 280/777 |
| 4,691,587 A | * | 9/1987 | Farrand et al. ............... 74/493 |
| 5,520,416 A | * | 5/1996 | Singer et al. ................ 280/775 |
| 5,524,927 A | * | 6/1996 | Toussaint .................... 280/777 |
| 5,690,362 A | * | 11/1997 | Peitsmeier et al. .......... 280/775 |
| 5,761,966 A | | 6/1998 | Cuiller et al. |
| 5,899,116 A | * | 5/1999 | Armstrong et al. ........... 74/492 |
| 5,943,916 A | | 8/1999 | Baumann et al. |
| 6,035,739 A | | 3/2000 | Milton |
| 6,116,648 A | * | 9/2000 | Holly et al. ................. 280/777 |
| 6,134,983 A | | 10/2000 | Armstrong et al. |
| 6,138,525 A | | 10/2000 | Riefe et al. |
| 6,152,488 A | * | 11/2000 | Hedderly et al. ............ 280/775 |
| 6,217,457 B1 | * | 4/2001 | Wayton et al. .............. 464/168 |
| 6,270,418 B1 | | 8/2001 | Oka et al. |
| 6,339,970 B1 | * | 1/2002 | Blex ........................... 74/492 |
| 6,378,903 B1 | * | 4/2002 | Yabutsuka et al. .......... 280/777 |
| 6,389,924 B1 | | 5/2002 | Ryne et al. |
| 6,398,259 B1 | | 6/2002 | Palmer et al. |
| 6,435,555 B1 | | 8/2002 | Seamon et al. |
| 6,517,114 B1 | | 2/2003 | Scheib et al. |
| 6,631,924 B1 | * | 10/2003 | Nomura et al. .............. 280/777 |
| 6,685,224 B1 | * | 2/2004 | Pardonnet ................... 280/775 |
| 2002/0137570 A1 | | 9/2002 | Castellon |

FOREIGN PATENT DOCUMENTS

ES 2169676 1/2002

* cited by examiner

Primary Examiner—David R. Dunn
(74) Attorney, Agent, or Firm—Michael D. Smith

(57) ABSTRACT

A steering column assembly has a hand wheel rotatable about an axis having at least one guide member and at least one guide bracket. A guide member is spaced adjacent the axis of the hand wheel and a guide bracket and a guide member have surfaces supporting and guiding the guide member and the guide bracket for relative sliding movement therebetween. At least one shear member acting between the guide member and the guide bracket maintain the guide member within the guide bracket. The shear member is shearable under a predetermined force permitting the guide member and the guide bracket to move relative to one another. Additionally, a mounting plate supporting the hand wheel and at least one guide member may provide for controllable relative movement between the hand wheel and the guide member.

26 Claims, 8 Drawing Sheets

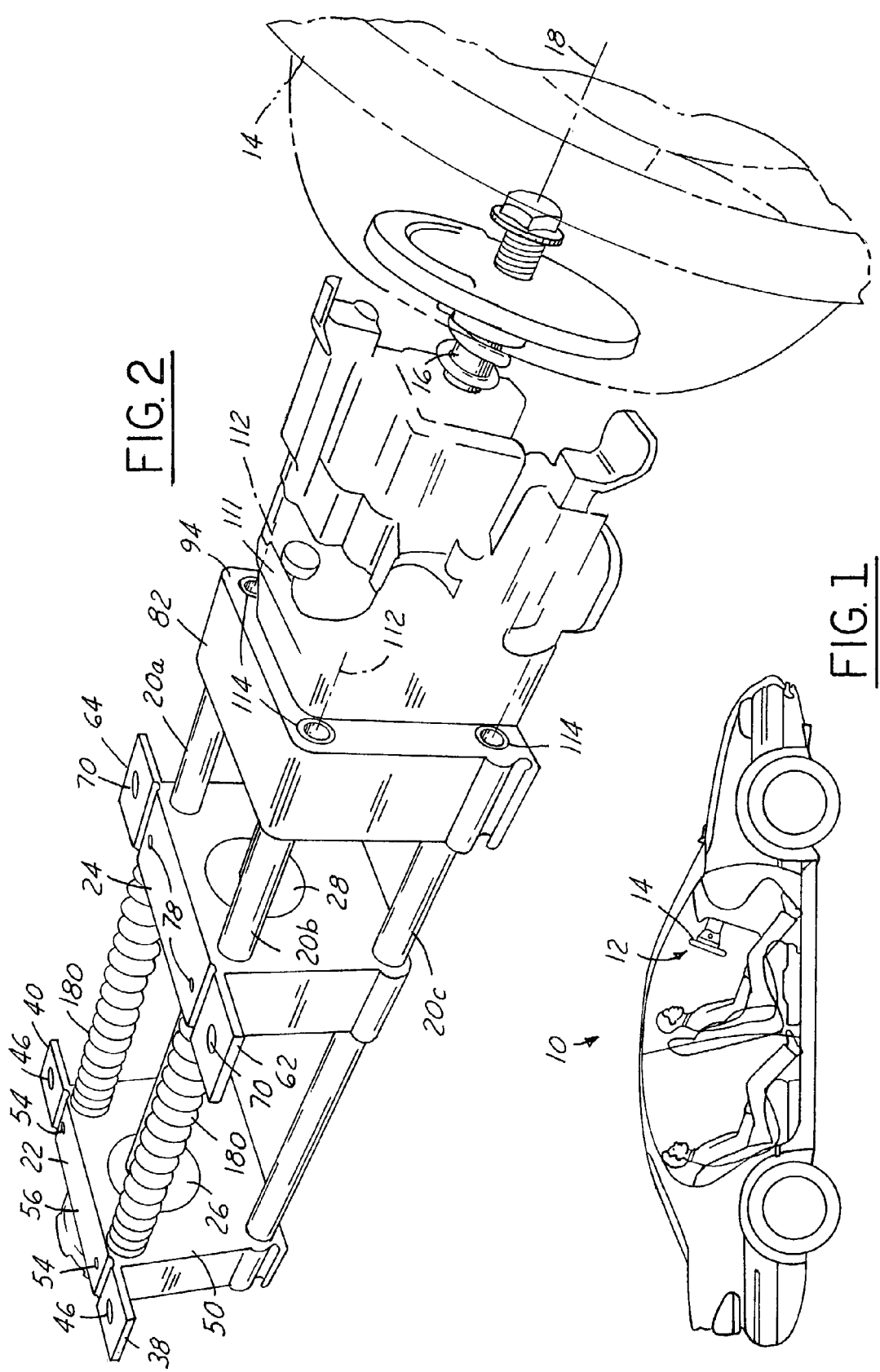

STEERING COLUMN WITH TUBULAR STRUCTURE

BACKGROUND OF THE INVENTION

1. Field of the Invention

The invention relates generally to steering columns and more particularly to collapsible steering columns.

2. Related Art

Steering columns must remain functional while experiencing the forces generated in normal use, and preferably absorb the forces encountered in crash conditions to reduce injury to a driver. Typically, steering columns are designed to collapse in a telescopic manner during crash conditions so that the driver of a vehicle encounters a reduced impact force if the driver hits the steering wheel. Known designs of collapsible steering column assemblies have a steering shaft inside of a generally concentric cylindrical jacket, and in a crash condition, both the steering shaft and the jacket collapse in a telescopic fashion to lessen the impact to the drive. The jacket of the steering column commonly has a mounting bracket that is fastened to the vehicle so that during impact, the bracket can shear away from the vehicle and travel with the jacket while the jacket is collapsing. The jacket of the steering column and the mounting bracket are commonly formed as separate pieces and then fixed to one another by welding the two pieces together. The mounting bracket has inserts molded therein to allow the bracket to shear away from its mounted location. During collapse, the jacket and steering shaft are free to move in a generally unguided direction. The jacket, typically being metallic and having a mounting bracket welded thereto can be a relatively heavy and costly component. For this reason, it is desirable to reduce weight and cost in a steering column assembly, while maintaining the integrity and collapsing characteristics required in a steering column assembly.

SUMMARY OF THE INVENTION

A steering column assembly providing for a lightweight, low cost design is shown having a hand wheel rotatable about an axis, having at least one guide member, and having at least one guide bracket. The guide member is spaced adjacent the axis of the hand wheel and the guide bracket and guide member have surfaces supporting and guiding the guide member and the guide bracket for relative sliding movement between a first uncollapsed position and a second collapsed position. At least one shear member acting between the guide member and the guide bracket restrict relative movement between the guide member and the guide bracket when in the first uncollapsed position. The shear member is shearable under a predetermined collapsing force permitting the guide member and the guide bracket to move relative to one another to the second collapsed position under the applied collapsing force.

Another embodiment has a mounting plate supporting the hand wheel and at least one guide member. The mounting plate provides for controllable relative movement between the hand wheel and the guide member between a first retracted position and a second extended position.

One advantage offered by this invention is that the steering column assembly including the guide members and guide bracket are relatively lightweight in design, therefore, improving the overall fuel efficiency of a vehicle.

Another advantage offered by this invention is that a steering column assembly utilizing guide members and guide brackets is cost efficient by reducing material and assembly costs, thereby reducing the total cost of a steering column assembly.

Another advantage offered by this invention is that the guide brackets facilitate collapsing of the steering column to provide a more reliable and predictable collapsing condition of the steering column assembly during a collapsing condition.

Another advantage offered by this invention is that a variety of configurations may be utilized in forming and/or arranging the guide members to provide for the desired rigidity of a steering column in a specific vehicle application.

Another advantage offered by this invention is that dampeners may be easily employed about the guide members to absorb energy during collapsing of the steering column reducing the impact force experienced by a driver making contact with a hand wheel.

Another advantage offered by this invention is that the guide brackets can be molded about the guide members to improve the manufacturability of the steering column assembly.

Another advantage offered by this invention is that the guide brackets may be manufactured from a variety of materials as best suited for the application.

Another advantage offered by this invention is that the forward position of the steering column assembly remains generally fixed so as to not interfere with components forward of the assembly during a collapse condition of the steering column assembly.

Another advantage offered by this invention is that the steering column assembly can collapse instantaneously upon impact reducing the impact force experienced by a driver making contact with the hand wheel.

It should be understood that the above advantages comprise only a partial listing of the advantages offered by this invention, and that one skilled in the art will recognize other advantages upon inspection of the preferred embodiment of this invention.

BRIEF DESCRIPTION OF THE DRAWINGS

These and other features and advantages of the present invention will become more readily appreciated when considered in connection with the following detailed description and appended drawings, wherein:

FIG. 1 shows a vehicle having a steering column embodying a preferred embodiment of the current invention;

FIG. 2 shows an enlarged isometric view of the steering column assembly from FIG. 1;

DETAILED DESCRIPTION OF PREFERRED EMBODIMENTS

Figure 3:
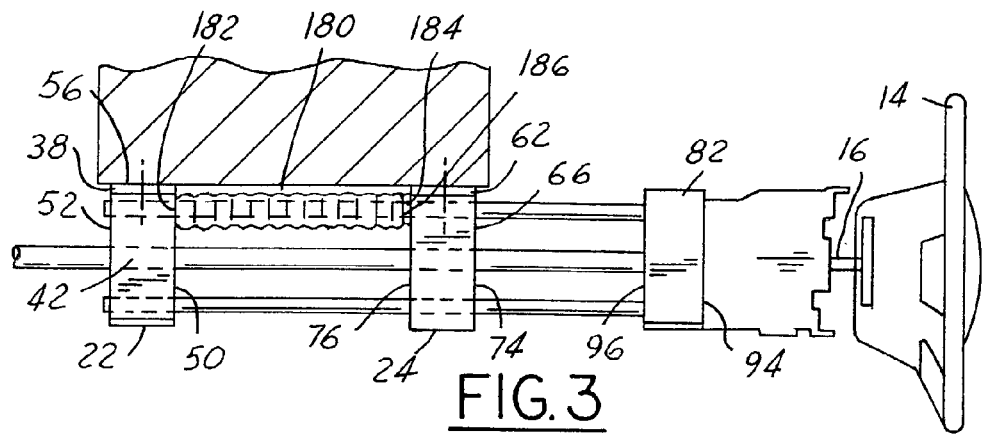
FIG. 3 shows a schematic side view of the steering column assembly in FIG. 2 while in a first uncollapsed position.

A vehicle 10 having a collapsible steering column assembly 12 constructed according to a presently preferred embodiment of the invention is shown generally in FIG. 1, and in greater detail in FIG. 2. The steering column assembly 12 has a hand wheel 14 attached to one end of a steering shaft 16 rotatable about an axis 18, and a guide bracket 24 is attached generally adjacent an opposite end of the steering shaft 16 to support a plurality of guide members 20(a–d). The guide members 20(a–d) are slideably supported within the assembly 12 providing the assembly 12 with a first uncollapsed position, and a second collapsed position. If a driver of the vehicle 10 were to get in an accident, thereby causing the driver to impact the hand wheel 14, the guide members 20(a–d) operate to slide relative to the guide bracket thus allowing the steering column assembly 12 to collapse in a telescoping fashion. By collapsing to the second collapsed position, the impact force experienced by the driver hitting the steering wheel 14 is greatly reduced, and thus the potential injury to the driver is minimized.

Figure 4:
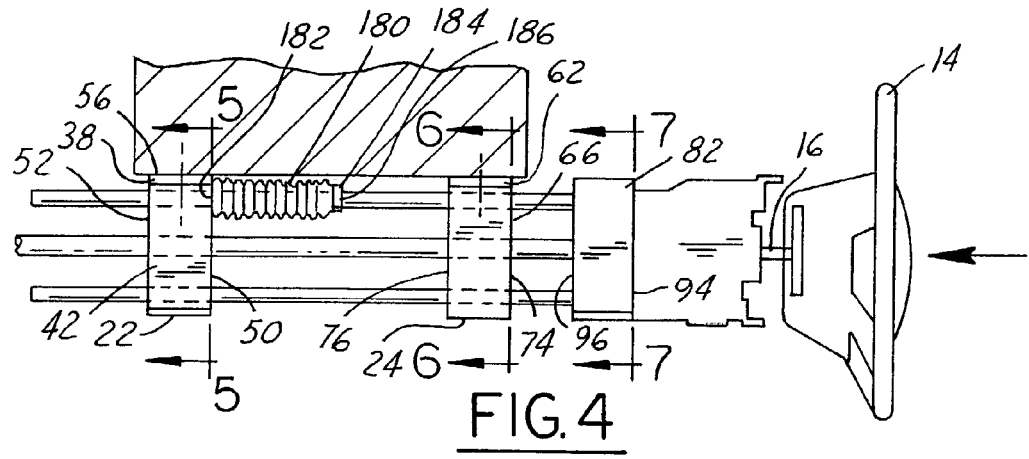
FIG. 4 shows a schematic side view of the steering column assembly in FIG. 2 while in a second collapsed position.

As shown in FIGS. 2–4, at least one and preferably a pair of guide brackets, shown here as a forward guide bracket 22 and a rearward guide bracket 24 slidably support the guide members 20(a–d) for relative movement between the guide members 20(a–d) and the pair of guide brackets 22, 24. Both the forward and rearward guide brackets 22, 24 preferably have a passage 26, 28, respectively, for rotatably receiving the steering shaft 16 and allowing the steering shaft 16 to rotate freely within the guide brackets 22, 24. One should recognize that the steering shaft 16 could pass laterally from and wholly separate from the guide brackets 22, 24, or the steering column assembly could be operated without a conventional steering shaft, such as in an electrically operated steering column, though this is not discussed hereafter.

Figure 5:
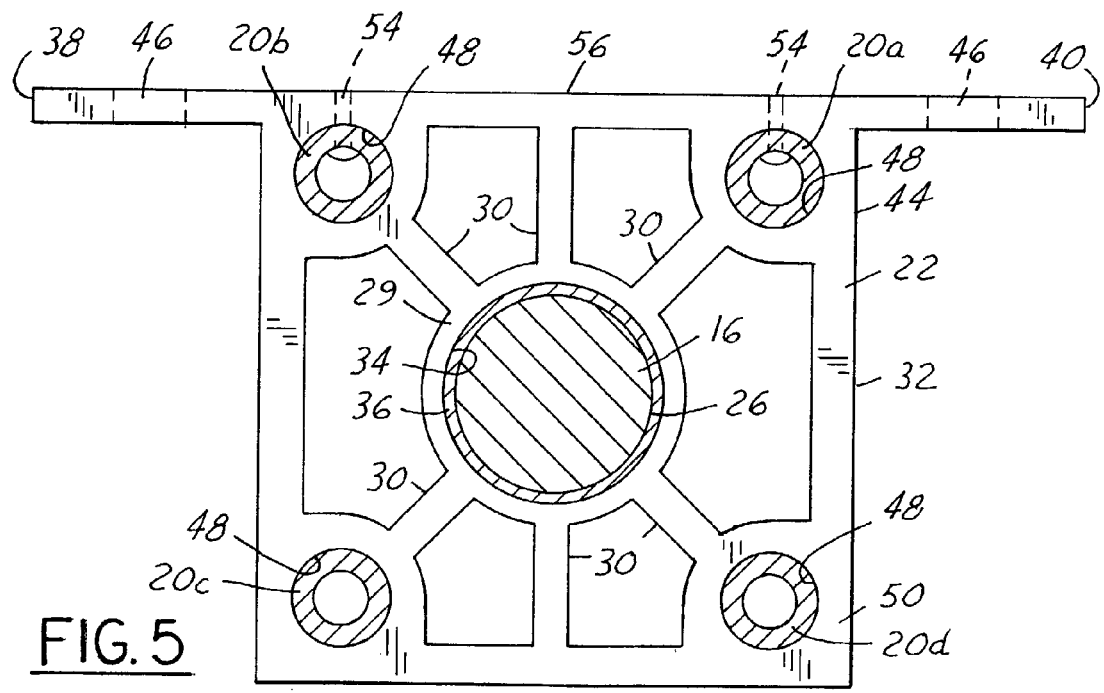
FIG. 5 shows a cross-sectional view of a forward guide bracket taken through line 5—5 in FIG. 4.

As best shown in FIG. 5, the passage 26 in the forward guide bracket 22 is defined by a generally circular wall 29 supported by a plurality of radially extending webs 30 extending from an outer wall 32 of the forward guide bracket 22. An outer surface 34 of the passage 26 is sized to receive a bearing 36 such that the bearing 36 is frictionally maintained within the passage 26 to rotatably receive the steering shaft 16. Preferably, a pair of flanges 38, 40 extend laterally outwardly from opposing sides 42, 44, respectively, of the bracket 22 with each flange 38, 40 having a through hole 46 to facilitate mounting the bracket 22 to the vehicle 10.

The forward guide bracket 22, shown to be generally rectangular, though any suitable shape could be used, has at least one opening 48 passing between a pair of opposing faces 50, 52 of the bracket 22, and preferably a plurality of openings 48 corresponding to the number of guide members in the steering column assembly 12. At least one of the openings 48, and shown here as the upper pair of openings 48 has an injection port 54 passing from a mounting surface 56 through to the opening 48. The injection ports 54 are used to facilitate maintaining the respective guide members 20(a–b) within the openings 48 while in the first uncollapsed position. It should be recognized that injection ports 54 may be incorporated into as many of the openings 48 as necessary to achieve the desired collapse characteristics of the steering column assembly 12.

The forward guide bracket 22 is preferably injection molded from a plastic or polymer, but can be molded or machined from a metallic material such as steel or aluminum as well.

Figure 6:
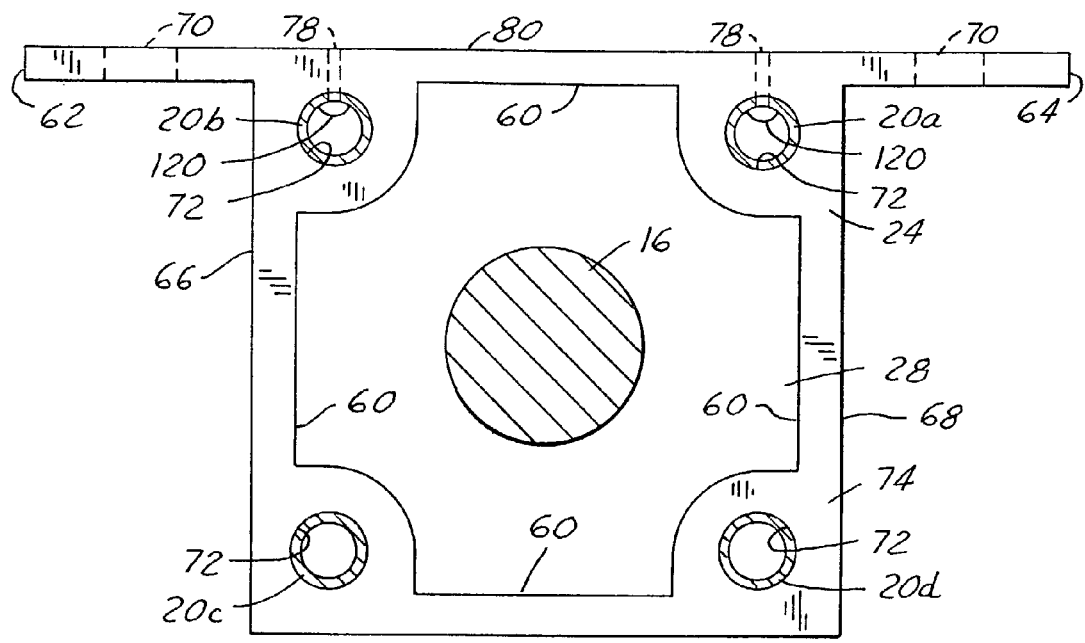
FIG. 6 shows a cross-sectional view of a rearward guide bracket taken through line 6—6 in FIG. 4.

As best shown in FIG. 6, the rearward guide bracket 24 is generally similar to the forward guide bracket 22, however the rearward guide bracket 24 is shown without a support or outer surface for a bearing. Rather, the passage 28 of the rearward guide bracket 24 is defined generally by the outer walls 60 of the bracket 24 through which the steering shaft 16 is free to rotate. It should be recognized however, that a plurality of webs and a support or outer surface could be incorporated into the rearward bracket 24 similarly as the forward bracket 22, though this is not shown here.

A pair of flanges 62, 64 extend laterally from opposing sides 66, 68 of the rearward guide bracket 24 and have through holes 70 therein to facilitate mounting the rearward guide bracket 24 to the vehicle 10. The rearward guide bracket 24 has a similar number of openings 72 passing between a pair of opposing faces 74, 76 of the bracket 24 as does the forward guide bracket for receiving the guide members 20(a–d). At least one of the openings, shown here as the upper pair of the openings 72, have injection ports 78 extending from a mounting surface 80 of the bracket 24 and into the openings 72. The injection ports 78 are used to facilitate maintaining the respective guide members 20(a–d) within the openings 72 while in the first uncollapsed position.

The rearward guide bracket 24 is preferably injection molded from a plastic or polymer material, however it should be recognized that it can also be molded or machined from a metallic material such as steel or aluminum.

Figure 7:
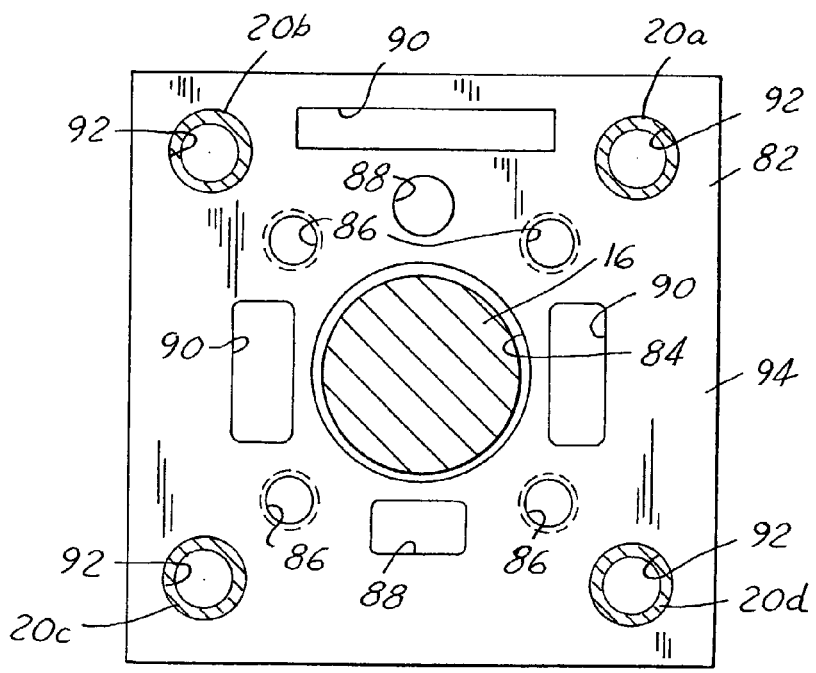
FIG. 7 shows a cross-sectional view of a mounting plate taken through 7—7 in FIG. 4.

As best shown in FIG. 7, a mounting plate 82 is shown having a through passage 84 for rotatably receiving the steering shaft 16 and having a plurality of threaded holes 86 for mounting upper steering components thereto. A pair of locator holes or recesses 88 are provided in the mounting plate 82 to facilitate locating the upper steering components while fastening the upper steering components to the mounting plate 82 via the threaded holes 86. Additionally, a plurality of cutouts 90 are shown in the mounting plate 82 to assist in reducing the weight of the mounting plate 82.

At least one, and preferably a plurality of openings 92 corresponding to the number of guide members in the steering column assembly 12 extend through opposing faces 94, 96 of the mounting plate 82 for receiving and maintaining the guide members 20(a–d) within the plate 82. Though the openings 92 in the mounting plate 82 facilitate attachment of the mounting plate 82 to the guide members 20(a–d), it should be recognized that the openings 92 may be provided as recesses, or may eliminated altogether in lieu of fixing the guide members to the face 94 of the plate 82, though this is not shown here.

The mounting plate 82 is preferably injection molded from a plastic or polymer material, however it can be molded or machined from a metallic material such as steel or aluminum.

Figure 8:
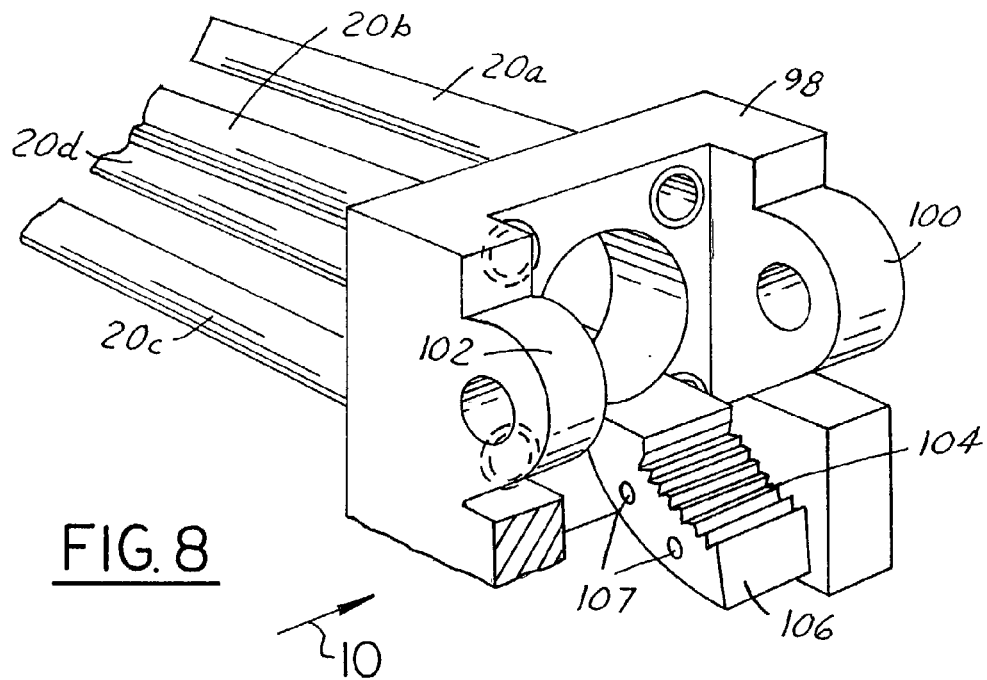
FIG. 8 shows an isometric view of an alternate embodiment of the invention with an integral tilt/mounting plate.

In an alternate embodiment, as best shown in FIG. 8, a mounting plate or clevis support 98 can be formed integrally with a pair of pin bosses 100, 102, providing for pivotal attachment of upper steering components. A tilt shoe carrier 106 with a plurality of teeth 104 providing for tilting adjustment the hand wheel 14.

The clevis support 98 is preferably injection molded from a plastic or polymer material, but can be cast or machined from a metallic material such as steel or aluminum. The tilt shoe carrier is preferably formed from a metallic material such as steel or other suitable material.

Preferably, through holes 107 are provided in the tilt shoe carrier 106 to facilitate attachment of the carrier 106 to the clevis support 98 through the use of ordinary bolts or some other suitable fastener.

Figure 10:
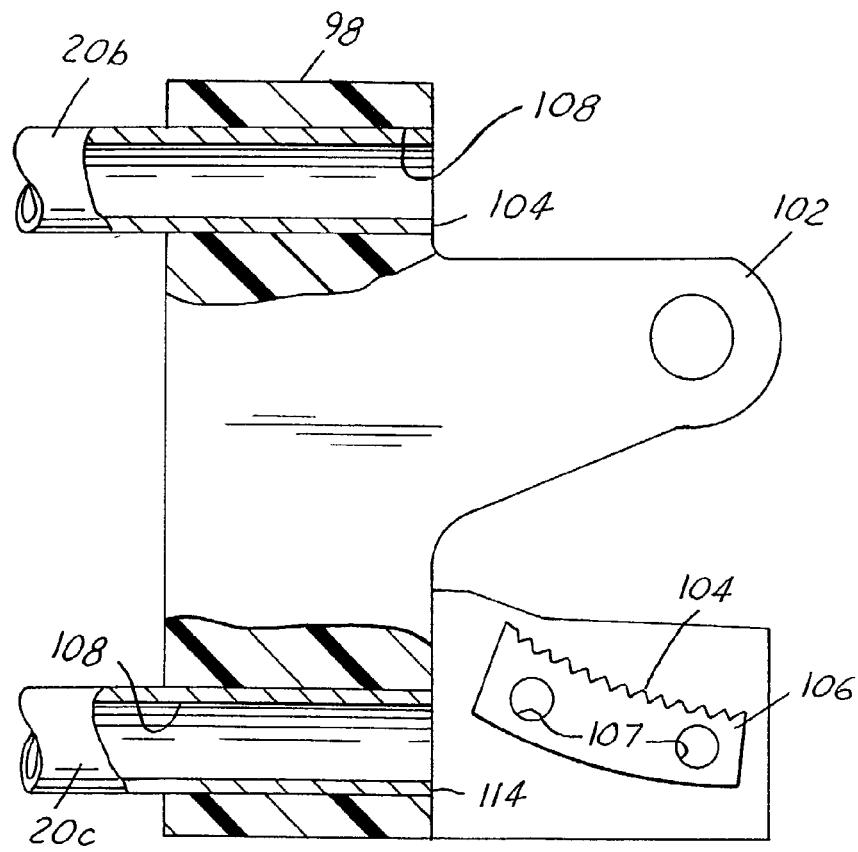
FIG. 10 shows a broken away side view looking in the direction of arrow 10 of the tilt/mounting plate in FIG. 8.

As best shown in FIG. 10, the clevis support 98 preferably has openings 108 for receiving and maintaining the guide members 20(a–d) within the levis support 104. It should be understood however, that the openings 108 need not be provided, and that the guide members 20(a–d) can be secured to a face 110 of the clevis support 108 by suitable means such as welding or an adhesive.

The upper steering components, including a housing 111 and a hand wheel 14, can be attached to the mounting plate 82, as shown in FIG. 2, through the use of ordinary bolts. In the alternate embodiment, they can be pivotally attached to the pin bosses 100, 102 of the clevis support 98 through the use of ordinary pivot pins (not shown).

As best shown in FIGS. 2–4, at least one guide member, and preferably a plurality of guide members, shown here as a pair of upper guide members 20(a–b) and a pair of lower guide members 20(c–d), are arranged to form a support structure for the steering column assembly 12. The guide members 20(a–d) have a longitudinal axis 112 and are arranged such that the longitudinal axis 112 is spaced laterally from and generally parallel to the axis 18 of the steering shaft 16. In one preferred embodiment, an end 114 of the guide members 20(a–d) is attached to and preferably maintained by the mounting plate 82 or clevis support 98, as shown in FIGS. 2 and 10, respectively. An interference or friction fit between the guide members 20(a–d) and the mounting plate 82 or clevis support 104 provides for a secure attachment of the guide members 20(a–d) such that the guide members 20(a–d) are maintained within the openings 92, 108, respectively, while in the first uncollapsed and second collapsed positions. Alternatively, it should be recognized that the guide members 20(a–d) may be attached to and maintained by the mounting plate 82 or clevis support 98 by fixing the members 20(a–d) to the faces 96, 110, respectively, of the mounting plate 82 or clevis support 98 by welding or some other suitable method of attachment.

The guide members 20(a–d) are sized to be slidably received within the openings 48, 72 in both the forward and rearward guide brackets 22, 24, respectively. Preferably, the fit between the guide members 20(a–d) and the guide brackets 22, 24 is such that the guide members 20(a–d) are maintained in a position within the guide brackets 22, 24 up to a predetermined applied axial force, and upon exceeding the predetermined axial force, the guide members 20(a–d) can slide within the openings 48, 72 of the forward and rearward guide brackets 22, 24, respectively, to a collapsed position.

Figure 9A:
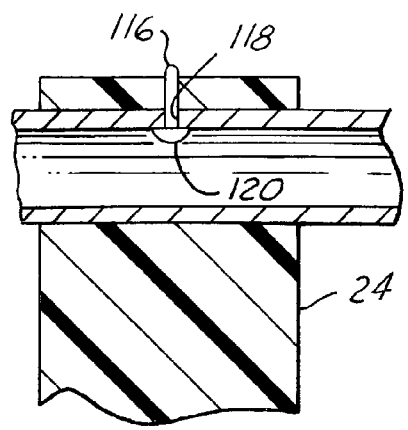
FIG. 9A shows an enlarged cross-sectional view of a guide bracket and guide member having a shear member maintaining the guide member within the guide bracket.

As best shown in FIG. 9A, to facilitate maintaining the guide members 20(a–b) within the forward and rearward guide brackets 22, 24, preferably a shear member 116 is injection molded in each injection port 54, 78 of the forward and rearward guide brackets 22, 24, respectively, and into the openings 118 in the respective guide members 20(a–b). An enlarged head 120 is preferably formed within the respective guide members 20(a–b) to maintain the guide members 20(a–b) within the guide brackets 22, 24. The shear members 116 are sized such that upon application of the predetermined applied axial force, the shear members 116 will sever or shear, thus allowing the guide members 20(a–d) to slide within the openings 48, 72 of the guide brackets 22, 24, respectively. It should be recognized that the shear members 116 can take on alternate forms other than being injection molded members, and could be pre-formed rivets, dowel pins, or the like.

Figure 9B:
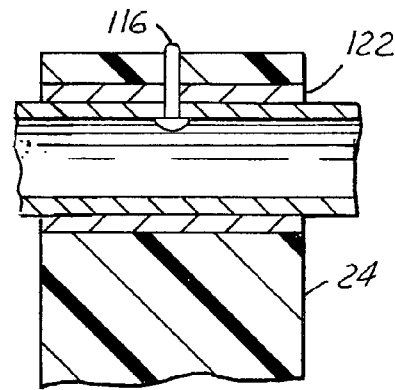
FIG. 9B shows an enlarged cross-sectional view of an alternate embodiment of the current invention with a bushing between a guide bracket and a guide member.
Figure 11A:
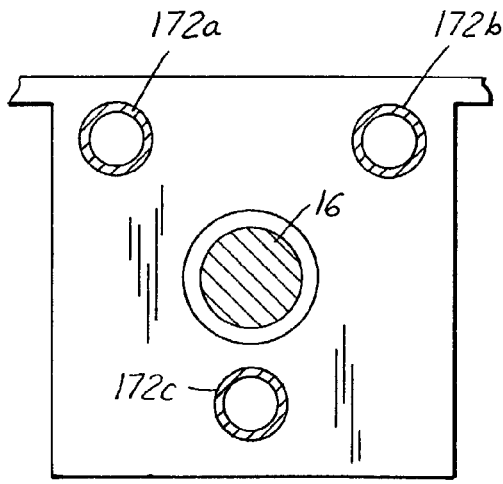
FIGS. 11 (A–D) show just a few of the potential configurations and arrangements of a plurality of guide members as received in a guide bracket.
Figure 11B:
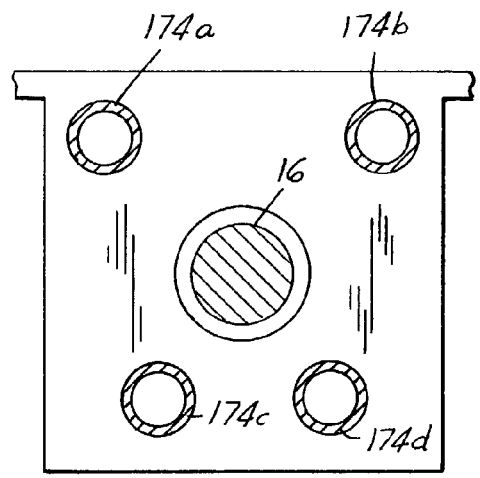
Figure 11C:
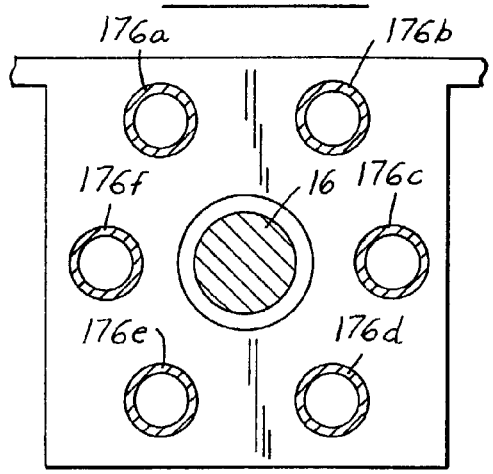
Figure 11D:
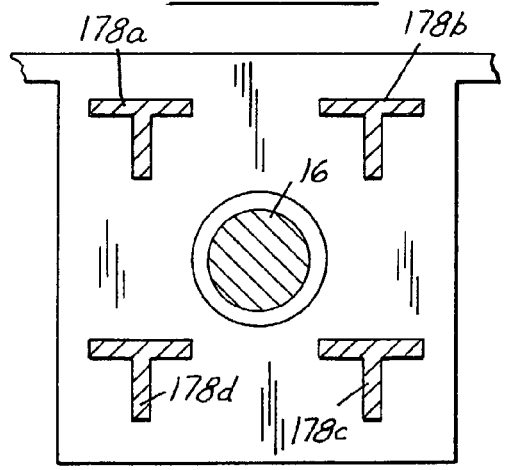

Alternatively, as best shown in FIG. 9B a bushing 122 can be received on each guide member 20(a–d) and within the openings 48, 72 of the rearward and forward guide brackets 22, 24, respectively, to facilitate sliding of the guide members 20(a–d) within the guide brackets 22, 24 upon exceeding the predetermined axial force. The bushings 122 can be separate from the shear members 116, or can be formed integrally with the shear members 116 by injection molding the shear members 116 and bushings 122 integrally as a unitary member, though they are shown as separate members here.

As best shown in FIGS. 11(A–D), the guide members can take on any suitable shape and arrangement as best suited for the intended vehicle platform. FIGS. 11(A–D) are meant only to show a few of the potential shapes and arrangements for guide members, and should not be viewed as an exhaustive list of possibilities.

FIG. 11-A shows three guide members 172(a–c) in a generally triangular arrangement about the steering shaft 16; FIG. 11-B shows four guide members 174(a–d) in a generally trapezoidal arrangement about the steering shaft 16, and FIG. 11-C shows six guide members 176(a–f) in a generally circular arrangement about the steering shaft 16. FIG. 11-D shows the guide members 178(a–d) to be generally T-shaped, thereby providing for different collapsing and strength characteristics of the guide members 178(a–d).

Figure 12:
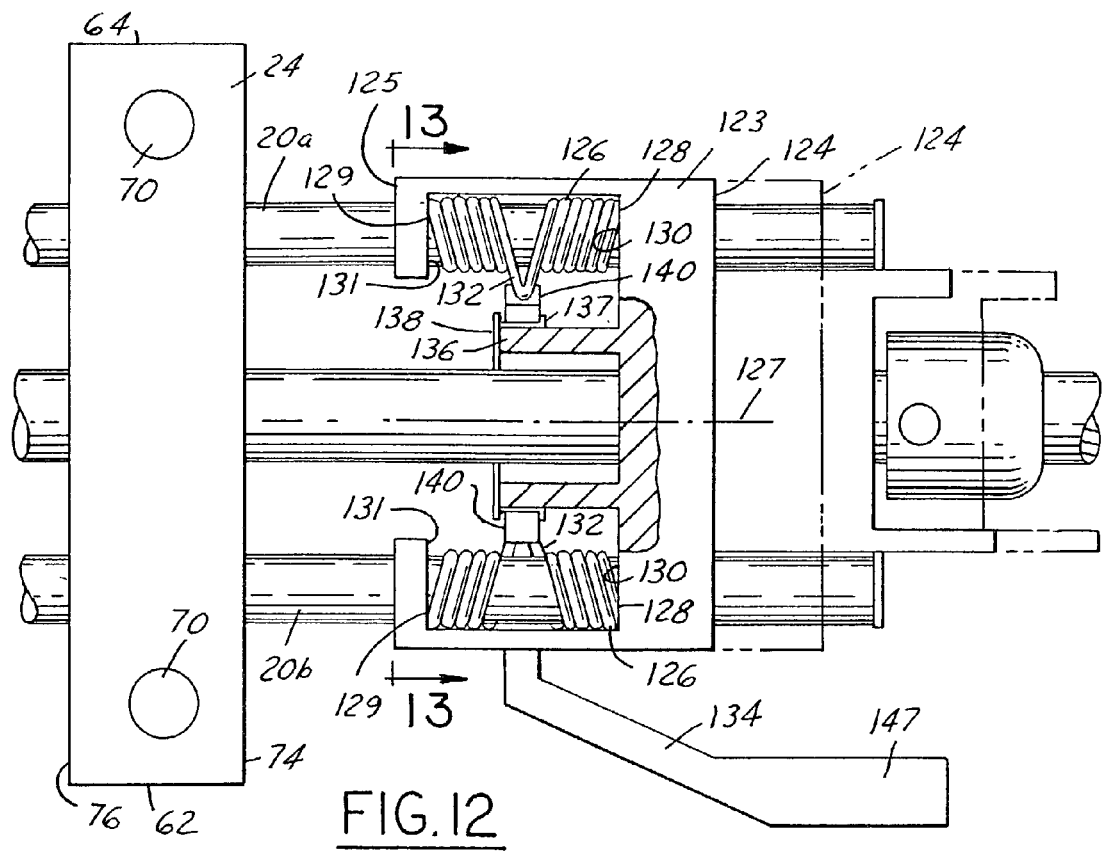
FIG. 12 shows a partial top view of a telescoping mounting plate in a first extended position and an alternative embodiment of the invention.
Figure 13:
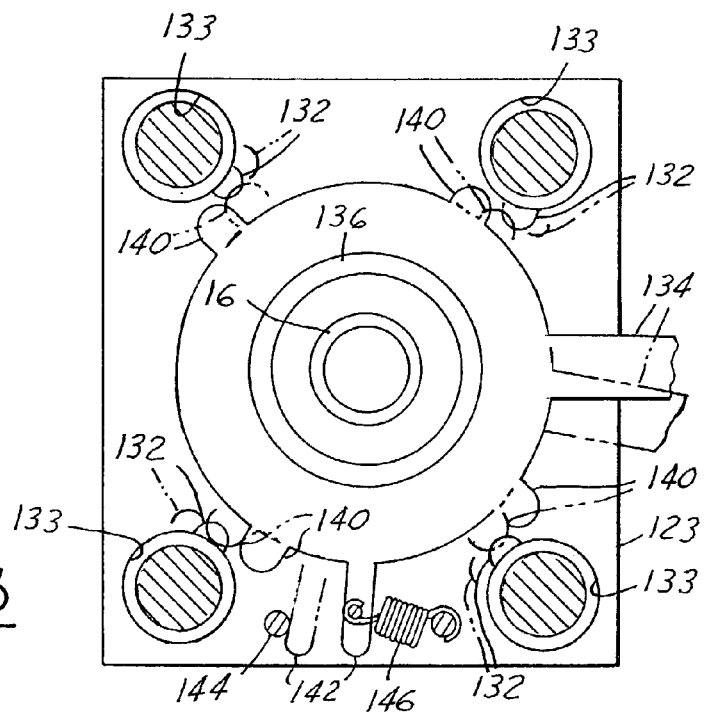
FIG. 13 shows the embodiment from FIG. 12 looking in the direction of arrow 13 showing a lever mechanism in an engaged position and disengaged position.

In an alternate embodiment, as shown in FIGS. 12 and 13, a mounting plate or clevis 123 supporting the hand wheel 14 provides for controllable relative movement between the hand wheel 14 and the guide members 20(a–d) between a first retracted position and a second extended position. A plurality of openings 133 in the mounting plate 123 are sized to receive the guide members 20(a–d) such that there is clearance between the guide members 20(a–d) and the mounting plate 123 to allow for slidable movement of the guide members 20(a–d) relative to the mounting plate 123. As shown in FIG. 12, the mounting plate 123 has a pair of opposite sides 124, 125 through which the openings 133 pass to receive the guide members 20(a–d). Preferably, for each guide member passing through the mounting plate 123, at least one spring lock 126 is incorporated to facilitate maintaining or locking the mounting plate 123 relative to the guide members 20(a–d) between the first retracting position and second extending position.

The spring locks 126 are shown to be coiled spring wire having coils converging generally towards an axial centerline 127 of the mounting plate 123 when installed around the guide members 20(a–d). The spring locks 126 are received around the guide members 20(a–d) and have a pair of ends 128, 129 that abut an interior surface 130, 131 of the opposing sides 124, 125, respectively, of the mounting plate 123. A lever portion 132 of the spring lock 126 extends generally inwardly towards the axial centerline 127 of the mounting plate 123 to facilitate engagement with a lever mechanism 134 to provide for a locked and unlocked position of the spring locks 126. When the spring locks 126 are in the locked position, the mounting plate 123 is maintained in a releasably fixed position relative to the guide members 20(a–d), and when in the unlocked position, the spring locks 126 allow for slidable movement of the mounting plate 123 relative to the guide members 20(a–d) between the first retracted position and the second extended position.

The lever mechanism 134 is constructed to be rotatably maintained by the mounting plate 123, and is shown here to be received by a central hub portion 136 of the mounting plate 123 and maintained on the hub portion 136 by a pair of retaining rings 137, 138. The lever mechanism 134 has a plurality of cam lobes 140 extending radially outwardly for each of the springs locks 126. The cam lobes 140 engage the spring locks 126 and disengage the spring locks 126 to provide for slidable movement and disengage the spring lock 126 to maintain the guide plate 123 relative to the guide members 20(a–d). An overtravel lobe 142 extending radially outwardly from the lever mechanism 134 limits the amount of rotational travel of the lever mechanism 134 about the mounting plate 123. The overtravel lobe 142 is designed to interfere with an overtravel stop 144 extending axially outwardly from the mounting plate 123. A return device or spring 146 is incorporated between the level mechanism 134 and the mounting plate 123 that tends to bias the lever mechanism 134 in the disengaged position. When a force is applied to a lever 147 of the lever mechanism 134 to move the lever mechanism 134 to the engaged position, the spring 146 resists the force, whereby upon releasing the force from the lever mechanism 134, the spring 146 biases the lever mechanism 134 back to its disengaged position.

Figure 14:
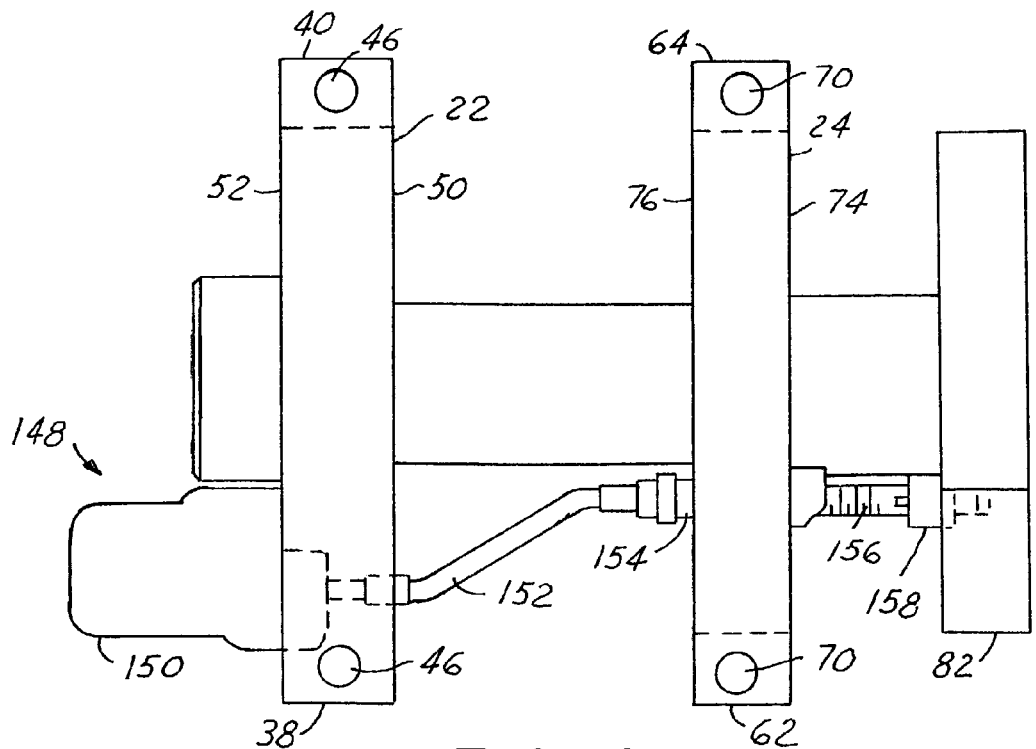
FIG. 14 shows an alternative embodiment of the current invention in a schematic top view of a steering column assembly having a power drive mechanism providing for a telescoping mounting plate in a first extended position and a second retracted position.

In alternative to having a lever mechanism 134 to facilitate telescoping the hand wheel 14 between an extended and retracted position, FIG. 14 shows a motorized mechanism 148 automating the telescoping travel of the hand wheel 14. The motorized mechanism 148 has a motor 150 that is preferably mounted to the forward guide bracket 22 and has a drive cable 152 extending from the motor 150 to a first nut 154 that is preferably mounted to the rearward guide bracket 24. The drive cable 152 is preferably a flexible drive cable and can bend to take on a generally S-shaped configuration to facilitate collapsing, though this is not necessary. A turn buckle screw 156 extends from the first nut 154 to a second nut 158 that is preferably mounted to the mounting plate 82. The turn buckle screw 156 has threads such that when the threads are rotated, they engage balls within the nuts 154, 158 to provide telescoping axial travel of the mounting plate 82 and thus hand wheel 14 between the extended and retracted positions. It should be recognized however, that instead of using a turn buckle screw 156, other mechanisms such as hydraulics, or a solenoid could be employed to provide for the telescoping travel.

Figure 15A:
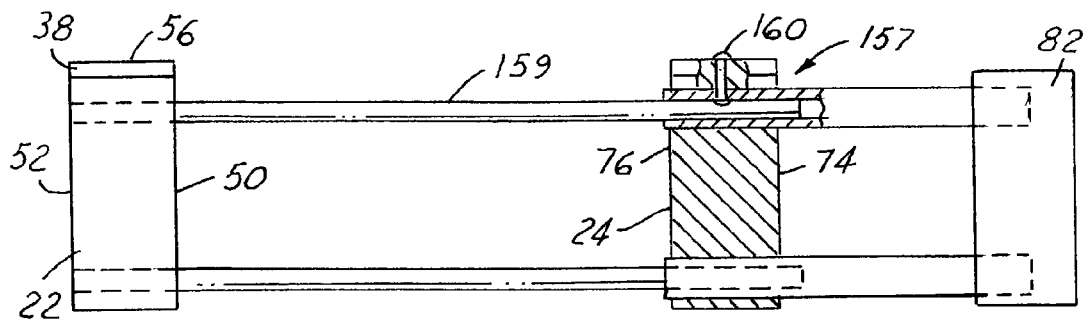
FIG. 15A shows an alternate embodiment of the invention in a schematic side view of a steering column assembly having telescoping guide members showing the assembly in a first uncollapsed position.
Figure 15B:
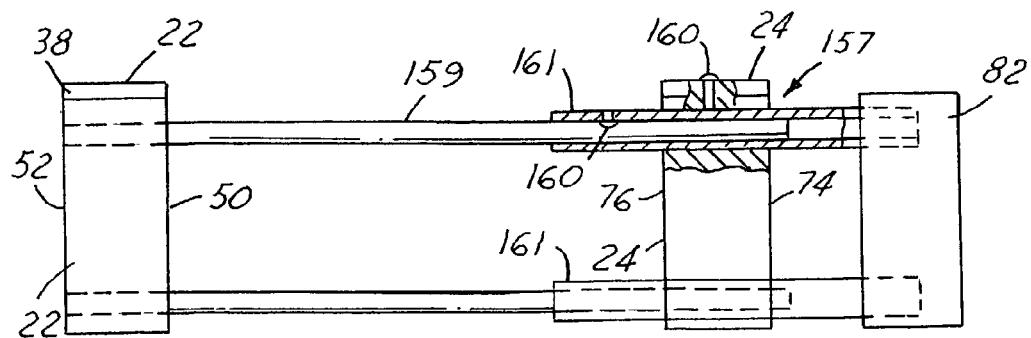
FIG. 15B shows an alternate embodiment of the invention in a schematic side view of a steering column assembly having a telescoping guide members showing the assembly in a second collapsed position.

FIGS. 15A–B show a construction according to a presently preferred embodiment of the invention wherein alternate guide members 157 can telescope within themselves from the uncollapsed position to the collapsed position. The guide members 157 are composed of two or more separate members, shown here as two separate members 159, 161, and can telescope relative to one another. As shown in FIG. 15A, to maintain the guide members 157 in the uncollapsed position, a shear member 160 can be employed between the separate members 159, 161 to maintain them in the uncollapsed position. As shown in FIG. 15B, upon encountering a collapsing force, the shear member 160 can shear thus allowing the guide members 157 to telescope relative to one another to the collapsed position. By providing for guide members 157 that telescope relative to one another, the area in front of the forward guide bracket 22 remains free from encroachment of the guide members 157 during collapsing of the steering column assembly. This helps to eliminate any interference of the guide members 157 with components of the vehicle 10 located forward of the forward guide bracket 22. It should be recognized that the shear member 160 may be the same shear member 116 maintaining the guide members 157 to the guide brackets 22, 24, or additional shear members 160 may be used.

Figure 16:
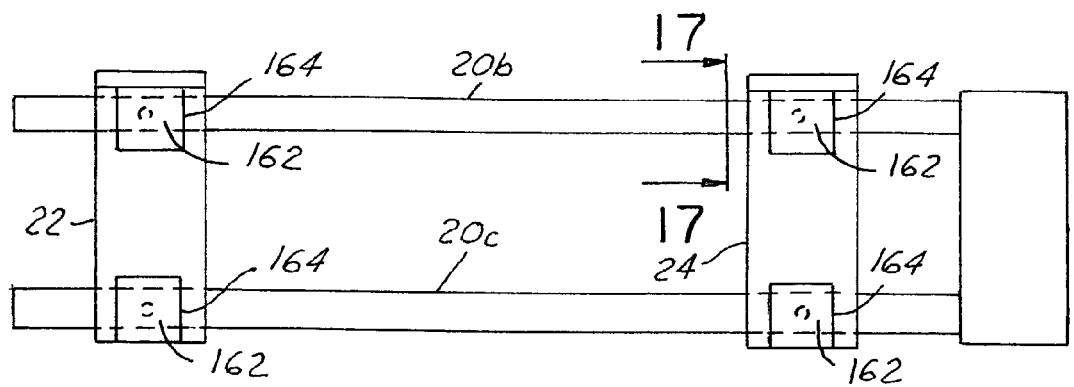
FIG. 16 shows an alternate embodiment of the invention in a schematic side view of a steering column assembly having an alternate shear mechanism.
Figure 17:
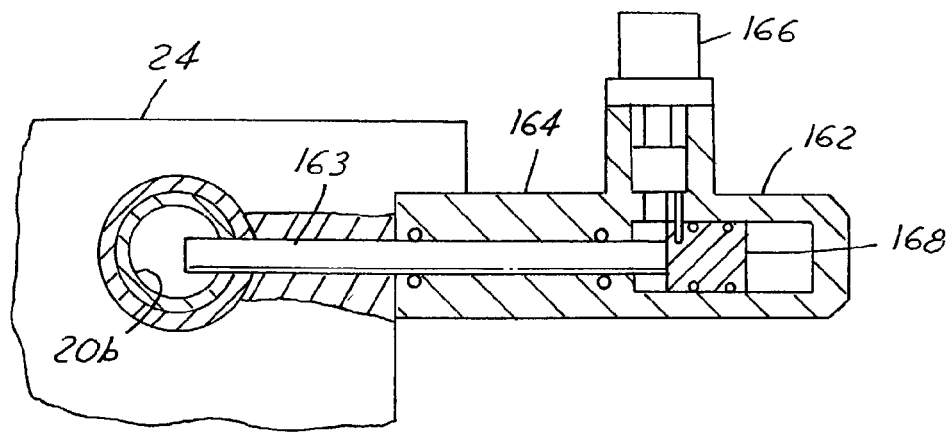
FIG. 17 shows an enlarged view looking in the direction of arrow 17 of the shear mechanism in FIG. 17 in an engaged position.
Figure 18:
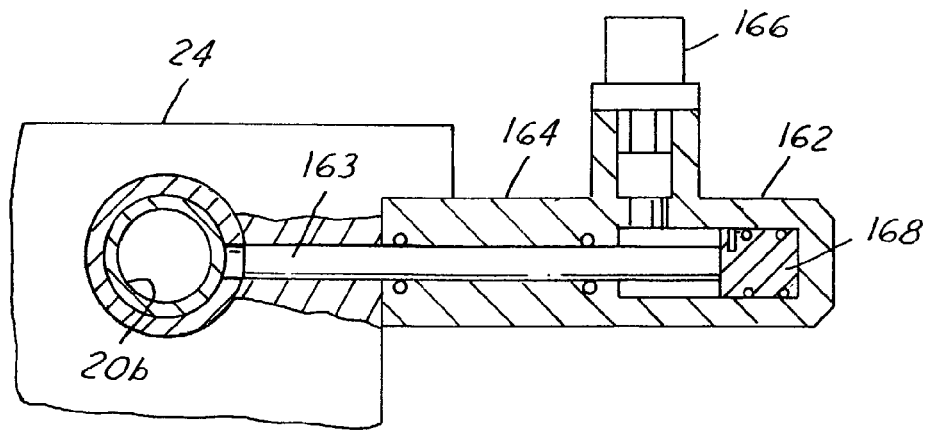
FIG. 18 shows the shear mechanism in FIG. 17 in a disengaged position.

FIG. 16 shows an alternate embodiment having a shear member 162 other than the injection molded shear members 116, 160 described in the previous embodiments. The shear member 162 shown here is a pyrotechnic pin puller and is preferably deployed by an electric signal that also deploys an airbag. As shown in FIGS. 17 and 18, the shear member 162 has a pin 163 that extends between the members to be maintained relative to one another, and retracts, thus allowing the members to move relative to one another. The pin 163 takes the place of an injection molded pin and is inserted within the guide members 20(a–d) to maintain the guide members 20(a–d) in the uncollapsed position relative to the guide brackets 22, 24. A housing 164 of the shear member 160 is preferably attached to or fabricated within the mounting brackets 22, 24 to locate the pin 163 in its desired position. The housing 164 has a pressure cartridge 166 and a piston 168 that operate to keep the pin 163 in an extended position, thus engaging the guide members 20(a–d) to be maintained relative to one another, and to retract the pin 163 to allow the members 20(a–d) to move relative to one another. To facilitate retracting the pin 163 from the guide members 20(a–d), a lubrication film or a bushing can be employed between the pin and the guide members. It should be recognized that it is desirable to employ the shear member 162 by the same signal that employs the air bag, however, a separate electrical signal could be used.

In operation, as best shown in FIG. 3, the steering column assembly 12 has a first uncollapsed position, and as best shown in FIG. 4, a second collapsed position. In normal use, the steering column assembly 12 remains in its first uncollapsed position until a predetermined axial force is applied generally along the steering shaft axis 18 of the steering column assembly 12. Upon meeting or exceeding the predetermined axial force, the steering column assembly 12 moves at least partially from the uncollapsed position and towards the second collapsed position. As shown, during collapse of the steering column assembly 12, the forward and rearward guide brackets 22, 24 are maintained in their original position on the vehicle 10, while the guide members 20(*a–d*) move slidably forward and through the openings 48, 72 of the guide brackets 22, 24, respectively. By collapsing the steering column assembly 12, the distance between the steering wheel 14 and the rearward guide bracket 24 decreases. By allowing the guide members 20(*a–d*) to slidably move within the openings 48, 72 of the guide brackets 22, 24, the direction in which the steering column assembly 12 collapses can be controlled. By controlling the direction in which the steering column assembly 12 collapses, it can be better determined how the steering column assembly 12 will collapse, thus allowing a more predictable and controllable collapse condition of the steering column assembly 12. This allows the steering column assembly 12 to be manufactured and designed in a manner to reduce or minimize the amount of force a driver of the vehicle 10 may encounter when impacting the hand wheel 14 of the vehicle 10 during a crash condition to reduce the potential for injury to the driver.

Additionally, a dampener shown here as a pair of convoluted tubes 180 can be received around the guide members 20(*a–d*) to reduce or minimize the force encountered by a person impacting the hand wheel 14. Though a pair of dampeners 180 is shown here, it should be recognized that any number of dampeners may be employed either between the forward and rearward guide brackets 22, 24, or between the rearward guide bracket 24 and the mounting plate 82. It should also be understood that the dampeners 180 can take on any shape and be made from any suitable material such as a plastic, polymeric or metallic material. The dampeners 180 absorb energy when the steering column assembly 12 collapses from the first uncollapsed position and towards the second collapsed position, thus helping to reduce the amount of force a person encounters during impact with the hand wheel 14. Preferably, one end 182 of the dampener 180 abuts the forward guide bracket 22 while in the second uncollapsed position and a washer 184 or the like is maintained on the guide members 20(*a–d*) so that the washer 184 abuts the other end 186 of the dampener 180. During impact and while the steering column assembly 12 is moving from the first uncollapsed position to the second collapsed position, the washer or washers 184 remain fixed to and move with the guide members 20(*a–d*), thus causing the washers 184 to collapse the dampeners 180. If dampeners 180 are employed between the rearward guide bracket 24 and the mounting plate 82, then the dampeners 180 would abut the rearward guide bracket 24 while in the second uncollapsed position and the washers 184 would be maintained on the guide members 20(*a–d*) and abut the other end 186 of the dampeners 180 as described above.

In the alternate embodiment that uses the lever mechanism 134 to provide for a telescoping hand wheel 14, the lever 147 of the lever mechanism 134 can be lifted, thus causing the lever mechanism 134 to rotate in a clockwise direction about the steering shaft axis 18, as viewed by the driver, such that the cam lobes 140 engage the lever portion 132 of the spring locks 126. By rotating the spring locks 126, the spring coils of the spring locks 126 unwind thus causing them to release from the guide members 20(*a–d*), in turn unlocking the spring locks 126 from the guide members 20(*a–d*). With the spring locks 126 in their unlocked position, the mounting plate 82, and thus hand wheel 14 can be telescoped to a further retracted or extended position. When the driver has the hand wheel 14 in the desired position, the lever 147 of the lever mechanism 134 is released by the driver, thus allowing the spring 146 to return the lever mechanism 134 to the engaged position, thus returning the spring locks 126 to their locked position. With the spring locks 126 in their locked position, the mounting plate 82 and thus hand wheel 14 are again releasably fixed and maintained relative to the guide members 20(*a–d*).

In the alternate embodiment that employs a motorized mechanism 148 to provide for a telescoping hand wheel 14, the motor 150 can be actuated, thus causing the drive cable 152, and thus the turn buckle screw 156 to rotate and retract or extend the mounting plate 82 and hand wheel 14 to the desired position. If the guide members 20(*a–d*) are caused to move relative to the guide brackets 22, 24 and to the collapsed position, the drive cable 152 of the motorized mechanism 148 preferably buckles to prevent restricting the guide members 20(*a–d*) from moving relative to the guide brackets 22, 24. As mentioned, to facilitate collapsing, the drive cable 152 is preferably flexible and conformed in a generally S-shaped pattern to facilitate buckling, however this is not necessary.

Obviously, many modifications and variations of the present invention are possible in light of the above teachings. It is, therefore, to be understood that within the scope of the appended claims, the invention may be practiced otherwise than as specifically described, in that the embodiment described above is only a description of preferred embodiments of the invention. The invention is described by the claims.

What is claimed is:

1. A steering column assembly, comprising:
   a hand wheel rotatable about an axis;
   at least one guide member having a longitudinal axis spaced generally laterally from said axis of said hand wheel;
   at least one guide bracket;
   said at least one guide member and said at least one guide bracket having surfaces supporting and guiding said at least one guide member and said at least one guide bracket for relative sliding movement along said longitudinal axis of said at least one guide member between a first uncollapsed position and a second collapsed position; and
   including at least one shear member acting between said at least one guide member and said at least one guide bracket fixing said at least one guide member to said at least one guide bracket when in said first position and shearable under a predetermined applied collapsing force permitting said at least one guide member and said at least one guide bracket to move to said second collapsed position under said collapsing force, and at least one dampener associated with said at least one guide member to absorb energy while said at least one guide member and said at least one guide bracket to move to said second collapsed position under said collapsing force.

2. The steering column assembly of claim 1 further comprising a mounting plate for rotatably supporting said hand wheel and maintaining said at least one guide member adjacent an end of said at least one guide member such that said mounting plate and said at least one guide bracket are axially spaced from one another along said axis.

3. The steering column assembly of claim 2 further comprising at least one dampener between said at least one mounting plate and said at least one guide bracket to absorb energy while said at least one guide member and said at least one guide bracket move to said second collapsed position under said collapsing force.

4. The steering column assembly of claim 1 wherein a separate one of said at least one dampener is concentric to a separate one of said at least one guide member.

5. The steering column assembly of claim 1 wherein said at least one shear member is injection molded.

6. The steering column assembly of claim 1 wherein said at least one guide member is at least partially hollow.

7. The steering column assembly of claim 1 wherein said at least one guide member is metallic.

8. The steering column assembly of claim 1 wherein said at least one guide member is extruded.

9. The steering column assembly of claim 1 wherein said at least one guide bracket is extruded.

10. The steering column assembly of claim 1 wherein said at least one guide bracket is metallic.

11. The steering column assembly of claim 1 wherein said at least one guide bracket is polymeric.

12. The steering column assembly of claim 1 further comprising at least one bushing, with a separate one of said at least one bushing between said at least one guide member and said at least one guide bracket.

13. The steering column assembly of claim 1 wherein two or more guide brackets are axially spaced from one another and remain axially spaced generally the same distance from one another in both said first collapsed position and said second uncollapsed position.

14. The steering column assembly of claim 1 wherein said at least one guide bracket is molded of plastics material.

15. The steering column assembly of claim 1 wherein said at least one guide member is comprised of at least two members arranged concentrically to one another to provide for relative sliding movement between said at least two members between said uncollapsed position and said collapsed position.

16. The steering column assembly of claim 1 wherein said shear member has a lock pin, said lock pin having an extended and retracted position, when in said extended position fixing said at least one guide member to said at least one guide bracket and when in said retracted position permitting said at least one guide member and said at least one guide bracket to move to said collapsed position.

17. The steering column assembly of claim 16 wherein said shear member is activated by an electrical impulse.

18. A steering column assembly, comprising:
a hand wheel rotatable about an axis;
a set of four guide members having longitudinal axes spaced from said axis of said hand wheel; and
a mounting plate supporting said hand wheel and said guide members providing for controllable relative movement between said hand wheel and said guide members between a first retracted position and a second extended position, and at least one spring lock associated with said mounting plate and received about at least one of said guide members and having a locked and unlocked position, said spring lock when in said locked position maintaining said mounting plate in a releasable position relative to said guide members, said spring lock when in said unlock position providing for slidable movement of said mounting plate relative to said guide members between said first retracted position and said second extended position.

19. The steering column assembly of claim 18 further comprising a lever mechanism having an engaged position and a disengaged position, while in said engaged position moving said spring lock to said unlocked position while in said disengaged position allowing said spring lock to return to said locked position.

20. The steering column assembly of claim 19 wherein said lever mechanism has at least one lobe engaging said at least one spring lock while in said engaged position and disengaging said spring lock while in said disengaged position.

21. The steering column assembly of claim 19 further comprising a return device, said return device biasing said lever mechanism in said disengaged position until a force is applied to said lever mechanism moving said lever mechanism to said engaged position, said return device returning said lever mechanism back to said disengaged position upon releasing said force from said lever mechanism.

22. The steering column assembly of claim 19 further comprising an over travel stop limiting the degree of travel of said lever mechanism between said engaged position and said disengaged position.

23. The steering column assembly of claim 18 further comprising a motorized mechanism having a rive cable arranged to provide relative movement between said mounting plate and said at least one guide member.

24. A steering column assembly, comprising:
a hand wheel rotatable about an axis;
a set of four tubular guide members having longitudinal axes parallel to and spaced from said axis of said hand wheel such that said axis of said hand wheel is centrally located relative to axis of said guide members;
a mounting plate supported on said guide members and supporting said hand wheel; and
at least one guide bracket axially spaced apart from the mounting plate and having four openings, each said guide member being slidably received in one said opening.

25. A steering column assembly, comprising:
a hand wheel rotatable about an axis;
a forward guide bracket having an opening;
a rearward guide bracket axially spaced from said forward guide bracket and having an opening axially aligned with said opening of the forward guide bracket;
a tubular guide member slidably received in the openings of the forward guide bracket and the rearward guide bracket and adapted for sliding movement between a first uncollapsed position and a second collapsed position,
at least one shear member acting between said guide member and one of said forward guide bracket and said rearward guide bracket, said shear member maintaining said guide member in said first uncollapsed position and shearable under a predetermined applied collapsing force to permit said guide member to move to said second collapsed position; and
a mounting plate for rotatably supporting said hand wheel, said mounting bracket being mounted on an end of said guide member axially spaced apart from the rearward guide bracket and axially moveable with said guide member toward said rearward guide bracket in response to a collapsing force.

26. A steering column assembly in accordance with claim 25,
wherein said forward and rearward guide brackets are axially spaced from one another in the direction of collapse and remain axially spaced generally the same distance from one another in both said first collapsed position and said second uncollapsed position.

* * * * *